United States Patent [19]
Miller et al.

[11] Patent Number: 5,949,551
[45] Date of Patent: Sep. 7, 1999

[54] IMAGE HANDLING METHOD USING DIFFERENT IMAGE RESOLUTIONS

[75] Inventors: Keith Alan Miller, West Henrietta; David William Dellert, Fairport; Carl Joseph Tesavis, Spencerport, all of N.Y.

[73] Assignee: Eastman Kodak Company, Rochester, N.Y.

[21] Appl. No.: 08/842,957

[22] Filed: Apr. 25, 1997

[51] Int. Cl.[6] .................................................. H04N 1/00
[52] U.S. Cl. ...................... 358/408; 358/403; 358/909.1; 358/527; 348/211
[58] Field of Search ............................ 382/299; 358/403, 358/408, 452, 453, 442, 527, 537, 487, 474, 296, 538, 447, 451, 909.1, 261.3; 395/200.48, 187.01; 348/207, 211

[56] References Cited

U.S. PATENT DOCUMENTS

| | | |
|---|---|---|
| 4,414,580 | 11/1983 | Johnsen et al. ............... 358/261.3 |
| 4,508,438 | 4/1985 | Kanaoka et al. . |
| 4,519,701 | 5/1985 | Kanaoka et al. . |
| 4,574,692 | 3/1986 | Wahli . |
| 4,607,949 | 8/1986 | Hakamada et al. . |
| 4,654,484 | 3/1987 | Reiffel et al. . |
| 4,671,648 | 6/1987 | Watanabe et al. . |
| 4,672,444 | 6/1987 | Bergen et al. . |
| 4,694,354 | 9/1987 | Tanaka et al. . |
| 4,705,391 | 11/1987 | Peeters et al. . |
| 4,746,207 | 5/1988 | Selin . |
| 4,760,428 | 7/1988 | Watanabe et al. . |
| 4,760,574 | 7/1988 | Budworth et al. . |
| 4,779,122 | 10/1988 | Signoretto . |
| 4,823,162 | 4/1989 | Renn et al. . |
| 4,862,200 | 8/1989 | Hicks . |
| 4,870,497 | 9/1989 | Chamzas et al. . |
| 4,873,577 | 10/1989 | Chamzas . |
| 4,929,972 | 5/1990 | Anderson et al. . |
| 4,937,615 | 6/1990 | Tokuda . |
| 5,086,310 | 2/1992 | Iwashita et al. . |
| 5,097,278 | 3/1992 | Tamamura et al. . |
| 5,126,540 | 6/1992 | Kashiqagi et al. . |
| 5,132,992 | 7/1992 | Yurt et al. . |

(List continued on next page.)

FOREIGN PATENT DOCUMENTS

| | | |
|---|---|---|
| 475 447 | 3/1992 | European Pat. Off. . |
| 503 391 | 9/1992 | European Pat. Off. . |
| 532 047 | 3/1993 | European Pat. Off. . |
| 3 644-630 | 12/1986 | Germany . |
| 3-223-736 | 10/1991 | Japan . |
| 3-223-737 | 10/1991 | Japan . |
| 3-231730 | 10/1991 | Japan . |
| 404 070 731 | 3/1992 | Japan . |
| 4-204734 | 7/1992 | Japan . |
| 4-273238 | 9/1992 | Japan . |
| 5-127271 | 5/1993 | Japan . |

OTHER PUBLICATIONS

"Picture Web Preview" Aug. 28, 1996, 16 pages from HTTP://WWW/PICTUREWEB.COM and HTTP://WWW-.PICTUREPLACE.COM.

*Primary Examiner*—Joseph Mancuso
*Assistant Examiner*—Vikkram Bali
*Attorney, Agent, or Firm*—James D. Leimbach

[57] ABSTRACT

An image handling method and apparatus for executing the method. The method comprises scanning at least a first resolution of a hardcopy image. A second resolution image signal of the same image which second resolution is lower than the first resolution, is communicated from a first location to a receiver at a second location remote from the first location, by a first communication method. The first resolution image signal is communicated from the first location to the receiver at the second location, by a second communication method which is physically independent of the first communication method, or following communication of the second resolution image signal, waiting until a predetermined condition independent of the communication of the second resolution image signal, then communicating the first resolution image signal from the first location to the receiver at the second location by the first communication method.

22 Claims, 5 Drawing Sheets

U.S. PATENT DOCUMENTS

| | | |
|---|---|---|
| 5,151,726 | 9/1992 | Iwashita et al. . |
| 5,153,936 | 10/1992 | Morris et al. ............................ 345/428 |
| 5,159,385 | 10/1992 | Imamura . |
| 5,160,952 | 11/1992 | Iwashita et al. . |
| 5,168,303 | 12/1992 | Ikenoue et al. . |
| 5,187,518 | 2/1993 | Kitagawa . |
| 5,231,451 | 7/1993 | Uekusa et al. . |
| 5,237,156 | 8/1993 | Konishi et al. . |
| 5,255,031 | 10/1993 | Ikenoue . |
| 5,264,683 | 11/1993 | Yoshikawa . |
| 5,272,549 | 12/1993 | McDonald . |
| 5,274,418 | 12/1993 | Kazami et al. . |
| 5,281,993 | 1/1994 | Croshetierre et al. . |
| 5,307,100 | 4/1994 | Kubo . |
| 5,319,401 | 6/1994 | Hicks . |
| 5,327,265 | 7/1994 | McDonald . |
| 5,344,730 | 9/1994 | Kitamoto . |
| 5,347,403 | 9/1994 | Uekusa . |
| 5,353,078 | 10/1994 | Aoshima . |
| 5,382,508 | 1/1995 | Ikenoue . |
| 5,383,027 | 1/1995 | Harvey et al. . |
| 5,404,196 | 4/1995 | Terashita et al. . |
| 5,426,513 | 6/1995 | Scorse et al. . |
| 5,428,423 | 6/1995 | Clark . |
| 5,428,747 | 6/1995 | Kitamoto . |
| 5,430,512 | 7/1995 | Itoh et al. . |
| 5,467,168 | 11/1995 | Kinjo et al. . |
| 5,471,265 | 11/1995 | Shibata et al. . |
| 5,477,353 | 12/1995 | Yamasaki . |
| 5,479,228 | 12/1995 | Tamamura et al. . |
| 5,493,408 | 2/1996 | Kurogane et al. . |
| 5,502,527 | 3/1996 | Kazami et al. . |
| 5,502,576 | 3/1996 | Ramsay et al. . |
| 5,552,994 | 9/1996 | Cannon et al. . |
| 5,561,531 | 10/1996 | Funazaki . |
| 5,584,025 | 12/1996 | Keithley et al. . |
| 5,600,563 | 2/1997 | Cannon et al. . |
| 5,760,916 | 6/1998 | Dellert et al. ............................ 358/408 |

IMAGE HANDLING METHOD USING DIFFERENT IMAGE RESOLUTIONS

FIELD OF THE INVENTION

This invention relates generally to the field of transmission of images and in particular to photography and image signals obtained from photographs.

BACKGROUND OF THE INVENTION

In conventional photography, a user exposes a photographic film in a camera and conveys (either personally, by mail, or some other delivery service) the exposed film to any convenient processing center. The processing center then chemically develops the film to form permanent hardcopy images (typically in the form of photographic negatives on the original film and/or photographic prints, or photographic positives in the case of reversal processed film). The hardcopy images are then conveyed back to the user (often by the user personally picking them up at the processing center). If a user desires to share the images with others without giving up their own hardcopies, they typically go through the highly tedious and time consuming effort of designating which hardcopy images are desired to be shared, returning the designated hardcopy images to the processor to produce further hardcopies, and conveying the further hardcopies to the person(s) with whom they wish to share. If later it is desired to share the images with other persons, the same process must typically be repeated. In fact, so much effort and time is required that most users will simply not bother with multiple image sharing.

It has been appreciated that users can conveniently distribute multiple image copies in little time, by scanning the hardcopy image on a home scanner to generate corresponding digital image signals, and then forwarding one or more copies of the digital image signal to others by means of electronic mail (such as over the Internet). Furthermore, the recent advent of services such as KODAK PICTURE DISK available from Eastman Kodak Company and other film processors, which allows a user to obtain a digital image signal of images of processed film on a disk for a modest price, even eliminates the need for the user to own a scanner. The availability of a digital image signal additionally allows a user to conveniently store, manipulate, and display or print copies of the images as desired at the user's location using conventional computer equipment U.S. Pat. No. 5,272,549 discloses a system in which a customer can connect his computer to a remote print or copy center to retrieve digital image signals of the customer's images. Those digital image signals are described as having been obtained on a scanner at the customer's location with the storage media then being shipped to the print or copy center, or obtained on a scanner at the remote print or copy center. Presumably, any media scanned at the copy center is identified by a manually entered identification for a particular customer so that customer can later retrieve them. Similarly, subsequent U.S. Pat. No. 5,477,353 describes a system in which one or more photographer units can connect to a centralized laboratory unit (containing a film processor, scanner, and printer). The '353 patent system is constructed with the purpose that a given user's films are processed and scanned at one central processing center, each assigned a unique identification code, and retrieved by that user at his remote terminal using the identification code. The retrieved images can then be manipulated by the user and printed at the central processing center. The customer identification is read off a magnetic tape which has been affixed to a film bag carrying the film, at the processing center. No instructions are provided in the magnetic tape since none are required in the system of the '353 patent.

The systems of the '549 or '353 patents, require that all digital image storage media (in the '549 patent) or hardcopy film (in the case of the '353 patent) carrying images from multiple users, must be conveyed to only one central processing center. This is inconvenient and may cause delays in such a system implemented on a country wide or worldwide basis.

A serious problem with systems of the type of the '549 or '353 patents, is that digital image signals represent very large amounts of data. This is particularly true if one wishes to maintain a sufficiently high resolution in digital images such that they approach photographic quality. For example, such images can easily be 1,000 by 2,000 pixels, and easily require several megabytes of data. This presents a real problem in situations where many images may need to be communicated from one location to a remote location. In particular, while it would be desirable to transmit such images over a relatively low access cost network such as conventional telephone lines, the transfer rates currently available over such public networks, particularly when large numbers of such high resolution images must be transmitted, can be slow. While this situation can be alleviated somewhat by using dedicated networks, including satellite transmission, such methods considerably increase cost. Alternatively, to speed up such transmission, a user can elect to transmit a lower resolution version of the image. However, this obviously results in a received image being less than the ideal higher resolution image a user might desire.

It would be desirable then, to provide a means by which a user can rapidly obtain, at a remote location, an image signal corresponding to a high resolution image without requiring an undue time for communication of such signal, and while avoiding more expensive communication means, while still providing the user with the high resolution image. It would be particularly desirable to provide such a solution in the context of situations where large volumes of high resolution images must be handled and made available to one or more users. Additionally, it would be desirable to provide a method and system which allows a user to simply have an exposed film delivered to any convenient one of a number of locations, at which locations the film is processed and scanned to yield high resolution image set signals, and which allows a user to access the resulting image signals from a remote terminal without having to keep track of which films were delivered to which location. In such a system it would be desirable if the various users can have rapid access to all of the image signals corresponding to their scanned images without the need to use high priced communication means.

SUMMARY OF THE INVENTION

The present invention recognizes that for many applications, such as in the scanning of consumer images at a scanner location and later access of them at a location remote from the scanner station, the end user (the consumer) will only need a lower resolution digital image for most applications (for example, for display on a monitor). The lower resolution digital images are a fraction of the size of a corresponding higher resolution image as might be produced by a scanner, the higher resolution being used, for example, to produce photographic quality prints. Additionally, the user desires access to computer displayable versions of their images as quickly as possible, while the need for higher resolution demanding activities such as having prints or reprints made, can be delayed by up to a few days. In the instant invention, lower resolution versions of an image are rapidly provided to the customer, while higher resolution versions of the image are made available some time after the lower resolution images can be accessed by the customer. This is accomplished by transferring low resolution versions of images to the digital image service using a first method of data transfer, while high resolution versions of the images are transferred to the service using a second method of data transfer. The first transfer method is typically faster than the second transfer method, and the transfer methods may be activated simultaneously or at different times. These transfers could even be separated by significant time, such as hours or days.

The present invention then, provides an image handling method and apparatus for executing the method, which in one aspect comprises::
(a) scanning at least a first resolution of a hardcopy image;
(b) communicating a second resolution image signal of the same image which second resolution is lower than the first resolution, from a first location to a receiver at a second location remote from the first location, by a first communication method;
(c) communicating the first resolution image signal from the first location to the receiver at the second location, by a second communication method which is physically independent of the first communication method, or following communication of the second resolution image signal, waiting until a predetermined condition independent of the communication of the second resolution image signal, then communicating the first resolution image signal from the first location to the receiver at the second location by the first communication method.

In another aspect of the present invention, there is provided an image handling method, and an apparatus for executing the method, comprising:
An image handling method comprising:
(a) processing exposed photographic film at a processor-scanner station which has both a scanner and a processor at the same location, to produce a hardcopy image set at the processor-scanner location;
(b) scanning the hardcopy image set at the same processor-scanner location at which it was processed, to obtain a corresponding first resolution image set signal;
(c) communicating a second resolution image set signal of the same images which second resolution is lower than the first resolution, from a first location to a hub station at a second location remote from the first location, by a first communication method;
(d) communicating the first resolution image set signal from the first location to the hub station, by a second communication method which is physically independent of the first communication method, or following communication of the second resolution image set signal, waiting until a predetermined condition independent of the communication of the second resolution image set signal, then communicating the first resolution image set signal from the first location to the hub station by the first communication method;
(e) storing the communicated first and second resolution image set signals at the hub station; and
(f) transmitting at least one image signal of the first and second resolution image set signals to any of a plurality of terminals remote from the hub station and the processor-scanner station.

The present invention provides a means by which a user can view and work with images from a remote location which holds a high resolution version of the images, without waiting to have large amounts of data communicated and without resource to more expensive communication methods. The large amounts of image data required for the high resolution version can be communicated to the user by the most efficient and cost-effective route, while still maintaining the ability for the user to access their images quickly. The invention has particular application where many users are having images scanned at remote scanner with the resulting large amounts of higher resolution imaging data having to be transferred to a central hub from which they can be later accessed by multiple users.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
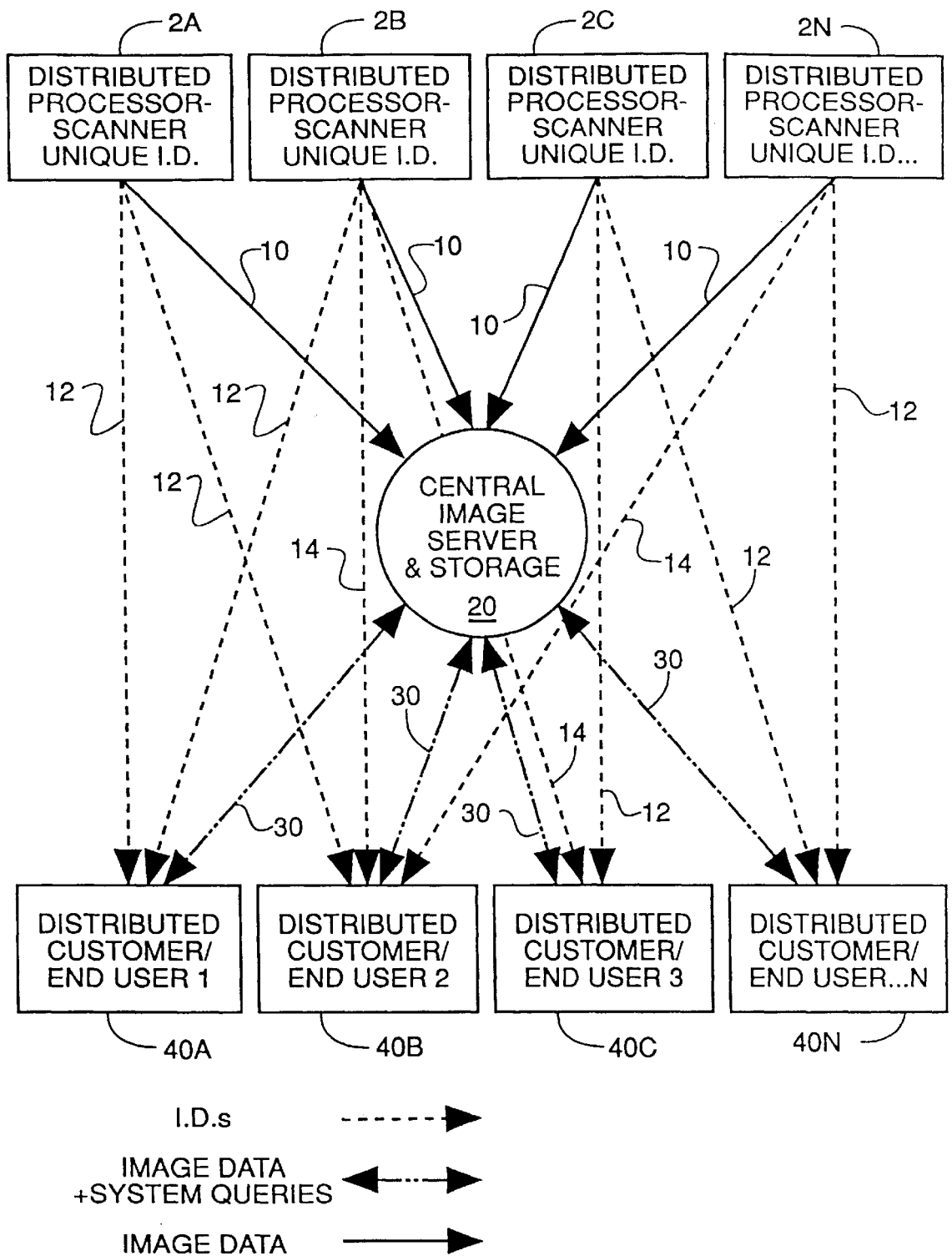
FIG. 1 is block diagram illustrating a system of the present invention.

In the present invention it will be understood that with reference to components being "remote" from one another, is meant that they will be at least in another building, and often a mile or more (such as 10, 100 or even 1000 miles) apart. A reference to "communication" refers, unless a contrary indication is given, to transfer of a signal. Such transfer can occur, for example, as a transmission of a signal between the sender and receiver, such as may be obtained over a computer network such as the Internet, dedicated communication line, or over a direct dial-up connection such as provided by a telephone line (any of which may include satellite or other non-wired links, in addition to wired and fiber optic links). Thus, "transmission" implies a signal transfer without a physical transfer of a storage means, such as by suitable "connection" (that is, an actual electronic communication link including a direct connection, such as over a telephone or direct satellite link, or an indirect connection as may occur over the Internet). In any event, due to the distances typically encountered between processor-scanner stations, hub station and terminals, there will typically be one or more signal repeaters between the originator of the communication and the receiver. Alternatively, the transfer of the communication can occur by the signal being saved on a suitable storage medium (such as magnetic or optical tape or disks) and the storage medium being physically transferred followed by the reading of the signal from the hardcopy at the receiver. A reference to "forwarded" refers, unless a contrary indication is given, to a transfer of both a signal (that is, a "communication") as well as to other means of transfer, such as the physical transfer of a hardcopy (for example, a suitable medium upon which data, such as alphanumeric characters, corresponding to a signal has been printed). Additionally, a "camera" can include digital, film or video cameras. A camera typically includes a lens, a photosensitive element (such as a CCD in the case of an electronic camera) or a place to hold a photosensitive element (such as a silver halide film) to receive light from the lens, an optional illumination means (such as a flash), a user interface (which may just be manual or electronic shutter and other controls), and an electronic storage medium in the case of an electronic camera (e.g. a solid state or magnetic storage such as in a digital camera), all contained in or on a single housing. A compartment or other means for holding a power supply (for example, batteries) in or on the camera is often also provided.

In the present invention reference is made to scanning of a hardcopy image to obtain a corresponding digital image. Such procedures and equipment for performing scanning, are well known. Typically, a film frame is scanned with a light beam, and the light transmitted through the film is detected, typically as three primary color light intensity signals, and digitized. The digitized values may be formatted to a standard for video display and stored on compact disc, magnetic media, or other suitable storage. Such image digitizers take a variety of forms and the various common aspects of film digitizing, particularly line illumination and linear CCD-based digitizers, are described in greater detail in U.S. Pat. No. 5,012,346. Also photographic prints can be digitized using reflection scanners.

Figure 2A:
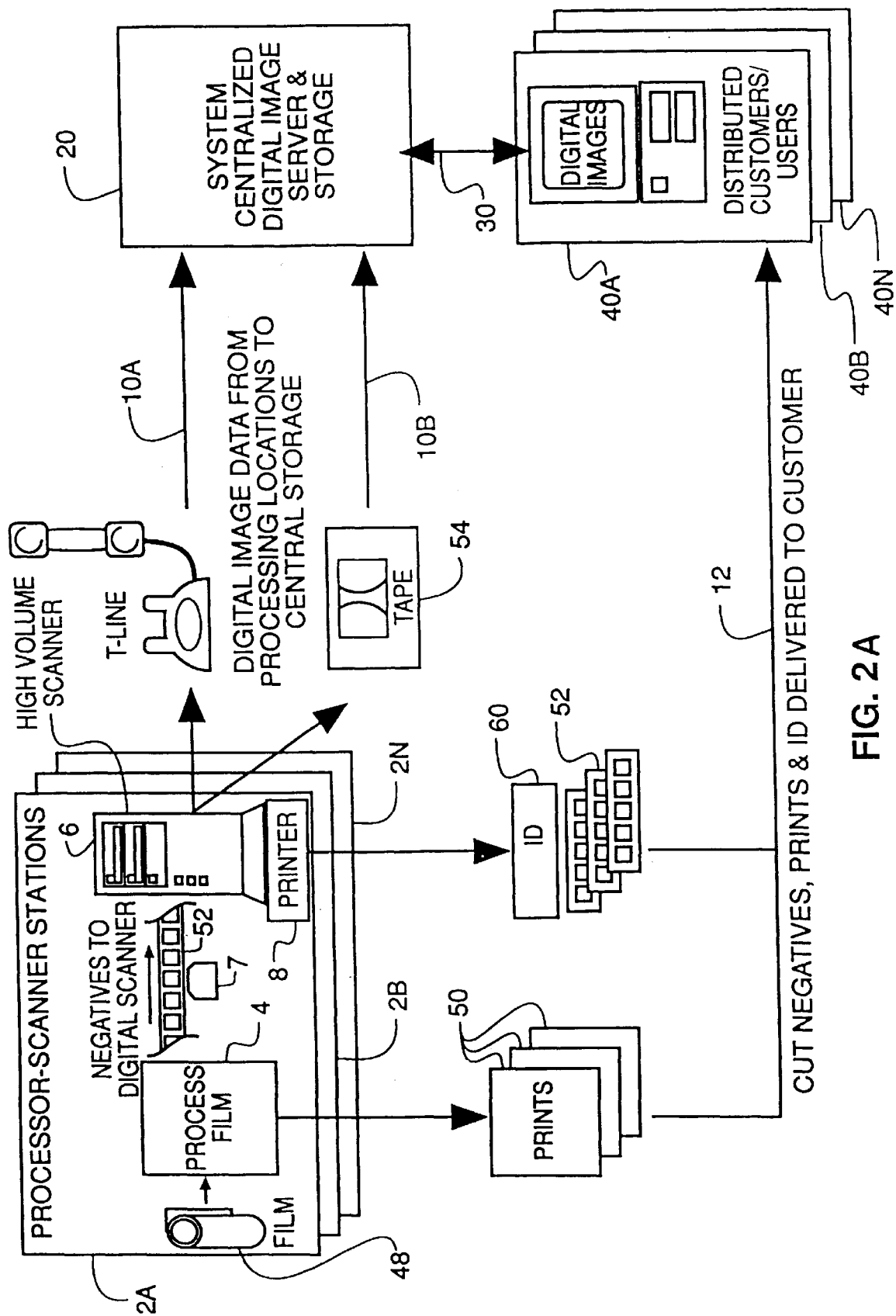
FIG. 2A is a data flow diagram illustrating the operation of some aspects of the system of FIG. 1.

Referring now to the drawings and particularly FIGS. 1 and 2A, the illustrated embodiment of the image handling system of the present invention includes a plurality of processor-scanner stations 2A, 2B, 2C to 2N which are remote from one another, as best seen in FIG. 1. Each processor-scanner station includes a film processor 4 (that is, a film developer) which can chemically develop exposed photographic film and produce fixed hardcopy images in the form of both print sets 50 and corresponding negative sets 52 (only one of which is shown in FIG. 2A). Negative image set 52 will typically be the developed negative film obtained from exposed film roll 48, while each print set 50 will typically be reflective prints of the negative set 52. However each set 50 and 52 can consist of one or more images.

Each one of the processor-scanner stations 2A to 2N has a data reader 7 which can read data on the film. Such data may be stored in various machine readable formats (e.g. optical or magnetic), but is preferably data stored in a magnetic layer. A suitable film and cameras for storing data magnetically on such a film are now widely available as Advanced Photo System ("APS") film and cameras. Also, suitable film, cameras and methods are described, for example, in U.S. Pat. No. 4,965,626, U.S. Pat. No. 4,965,627, U.S. Pat. No. 4,977,419, U.S. Pat. No. 5,021,820, U.S. Pat. No. 5,028,940, and U.S. Pat. No. 5,194,892. The data can include an indication as to which ones of the processed images from the film are to be scanned to produce corresponding image signals, and which of the image signals are to be communicated to a remote hub station. The data can further include a category identification for any one or more of the images indicating that they are to be stored in particular identified categories at a remote hub station 20. The category identification may include a user category (such as a user identification directing which user's name a particular image is to be stored under) as well as an album category (that is, a sub-directory or other linking to identify an image as belonging to a particular class of images as considered appropriate by the user). As well, an indication of the hub station's address can be contained in the data. Such indication may be direct, such as the hub station's geographical location (e.g. mailing address) or electronic mail address, or indirect, such as another address which can be related to the hub station address. For example, an indirect indication may be the user's address or postal code, which can then be related through a suitable database, such as may be located at the scanner-processor station (or a hub station, as described below), to the hub station geographically closest to the user's address. Note that the data may indicate that only some of the processed images are to be scanned and communicated to a hub station, and that different images can be directed to be communicated to different hub stations and/or different identified categories at a hub station. Other data which can be read by data reader 7 from film 48, can be data indicating that identified one or more images or the entire film 48, are considered high priority images. High priority images are those for which it is optionally desired that the highest scanned resolution of the images be available to the user at a remote terminal as soon as possible, even though this may result in a greater money charge to the user. This data can be placed on the film 48 by a suitable camera or at the processor-scanner stations 2 in response to a customer order.

Each processor-scanner station 2A to 2N further includes a high volume scanner system 6 which includes a suitable scanner for scanning the hardcopy images on each negative set 52 to obtain a corresponding digital image set signal which is at a first resolution. The first resolution is sometimes referenced herein as a "high" or "higher" resolution, and may, for example, be in the order of 1000 by 2000 pixels. High volume scanner system 6 may be a digital computer suitably programmed to perform the necessary steps discussed herein, in the form of a workstation or desktop computer equipped with a suitable digital scanner for scanning negative set 52. Each scanner system 6 is capable of generating a second resolution image signal from the first resolution image signal (that is, "deriving" the second resolution signal from the first resolution signal) by known image processing techniques. Alternatively, the scanner itself can scan both a separate first and second resolution image set signals. The second resolution image signal is of a lower resolution than the first image signal, and may, for example, be about 600 by 400 pixels or even less (such as about 50 by 100 pixels or less). Note that the first resolution image set signal described herein includes the possibility that, where a corresponding second resolution image set signal is first sent to hub station 20, the first resolution image set signal may be simply the remaining data required to reconstruct the first resolution of the image actually scanned by the scanner, when combined with the data of the corresponding second resolution image set signal. In this case, the first resolution image set signal need not necessarily be by itself then, all of the data necessary to reconstruct the first resolution actually scanned by the scanner. Additionally, each scanner system 6 can assign an associated identification signal to each image set signal so obtained. This assignment may be accomplished by suitable software running on scanner system 6, and is described further below. However, it will be noted at this point that each identification signal is unique in that it includes a scanner location identification which is unique for each processor-scanner station 2A to 2N.

Figure 3:
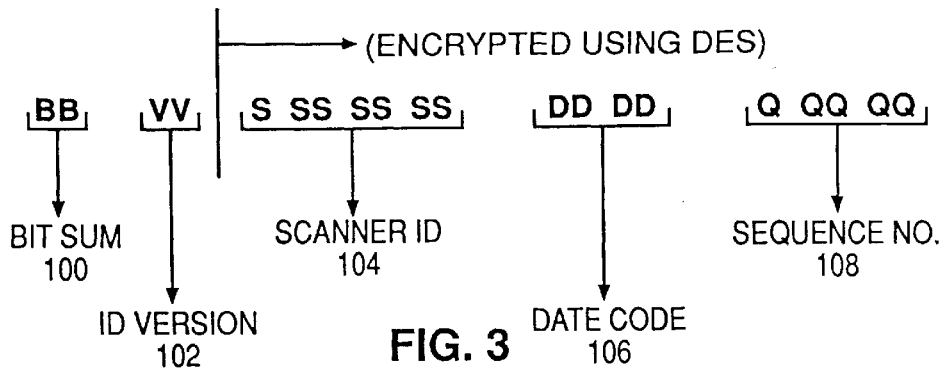
FIG. 3 is a diagram illustrating the components of an identification generated for an associated image set signal.

As to the details of the identification assigned to each associated image set signal, this is shown more fully in FIG. 3. The components of the assigned identification are as follows:

Bit Sum 100: the unsigned sum of the binary identification ("ID") data including ID version, Scanner ID, Date Code and Sequence Number (8 bits binary). The bit sum will be calculated after encryption but prior to conversion to the ASCII representation. The purpose of this Bit Sum is to identify data entry errors without querying the data base of a hub station 20 for an associated image set signal.

ID Version 102: revision number of this ID number (8 bits binary). This maps to the encryption key, a new version should accompany any change in the key.

Scanner ID 104, unique identifier for each processor-scanner station 2A to 2N (28 bits binary), which therefore serves as the scanner location identification.

Date Code 106, date a scan of a hardcopy image set began on (16 bits binary—9 bits for day of year and 7 bits for year). Year 0 will be any year in which the system of FIGS. 1 and 2A is first activated.

Sequence Number 108, incremented for each roll scanned within a day (20 bits binary).

The actual ID signal will be created from the binary representation of the Bit Sum 100, ID Version 102, Scanner ID 104, Date Code 106 and Sequence Number 108 as shown below in FIG. 3 (note that the ID Version 102 and Bit Sum 100 must not be encrypted):

The ID, minus the Bit Sum 100 and ID Version 102, will be encrypted prior to conversion to its ASCII form by using DES (Data Encryption Standard) functions with a 56 bit key. DES is described in "Applied Cryptography; Protocols, Algorithms, and Source in C", by Bruce Schneier, 1994, John Wiley & Sons, Inc. The key will be non-obvious and known to the hub station 20 (that is, saved in a storage at hub station 20). The key will be provided to valid scanner sites when the key is changed allowing them to begin producing ID signals encrypted with the new key. This change may be required if an old key has been recognized by someone attempting to claim images which are not theirs. A change to the key will map to a new ID version and this association will be kept at hub station 20. The ID Version 102 facilitates the decryption process by associating the key used to encrypt a given ID Version with a non-encrypted portion of that ID. This will allow the ID to be decrypted and its component parts associated with a roll when it is loaded (that is, saved) by the hub station 20. The ID will result in an audit trail for all digital image sets loaded by the central hub station 20. This audit trail can be used by hub station 20 to respond to end user queries about the status of the digital image sets, as described below.

The ID will be presented to the user (such as by printing a hardcopy) as 16 case insensitive alphanumeric ASCII typeable characters (i.e. 10 byte binary ID represented in base 32 using 0–9 and Aa-Vv where 0=0, 1=1, . . . , Aa=10, . . . , Vv=31).

As can be seen from the above, the non-encrypted ID is incremented for each film roll received at a given scanner station. If nothing further was done to the ID, a malicious user at a remote terminal could simply increment a received ID and thereby access another's digital image set. However, due to the encryption of the ID as described above, the resulting encrypted identifications for a series of different film rolls sequentially scanned at the same location, no longer bear the same sequential relationship as the non-encrypted identifications. In fact, the encrypted identification for one film roll in such a series cannot be determined from the encrypted identification of another roll, without knowledge of the encryption or decryption algorithm. The presence of the non-encrypted bit sum 100 (sometimes referenced as a "checksum") makes it even more difficult to falsify an ID.

Figure 2B:
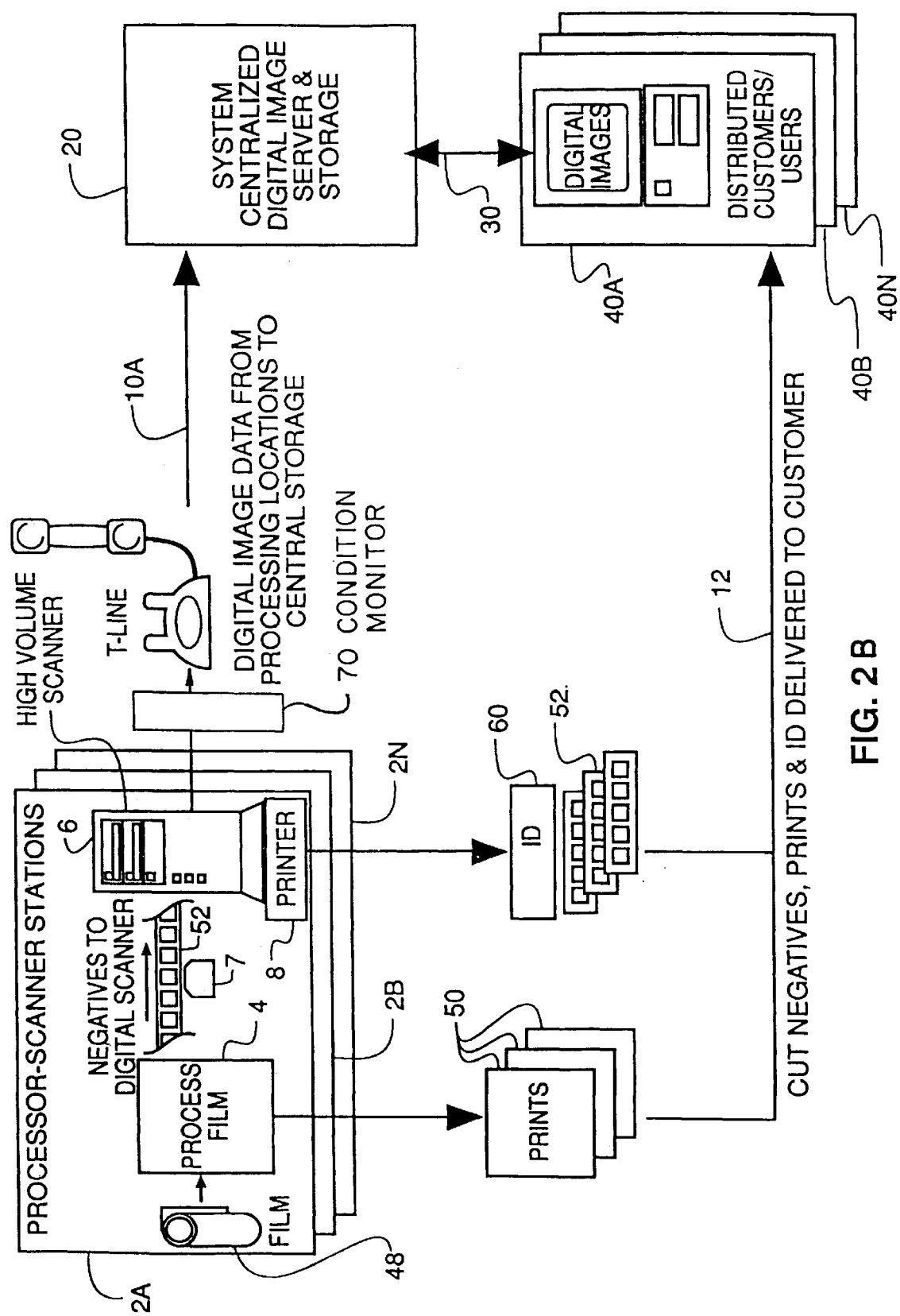
FIG. 2B is a diagram similar to FIG. 2A but illustrating an alternative embodiment of the system of FIG. 1.

The embodiment illustrated in FIG. 2B is identical to that of FIG. 2A except for the particular communication means as will be described below.

Each processor-scanner station 2A to 2N further includes a first communication system to communicate each second resolution image set signal and its associated identification signal to the remote hub station 20, which is part of the image handling system. This first communication system is illustrated as a communication link 10 in FIG. 1. In the embodiment shown in FIG. 2A, the first communication system comprises both a first communication means and a second communication means (the second communication means being distinct from the "second communication means" referenced below). In the embodiment shown in FIG. 2B, the first communication system has only a first communication means and no second communication means.

Referring to the embodiment of FIG. 2A, the first communication system has a first communication means which may be in the form of a modem (not shown) in scanner system 6, which automatically transmits each second resolution image set signal and associated identification signals over a link 10A (a first network) in the form of a connection to the hub station 20, such as telephone circuit connection. However, the first communication means could be a modem or communication card which communicates with hub station 20 over a different type of connection, such as a dedicated line connection or a network (such as the Internet). Of course, the various processor-scanner stations 2A to 2N in FIG. 1 may use different first communication means, and therefore the various links 10 shown in FIG. 1 may be the same, or a combination of connections or physical transfer links, one or more of which may be active at any given time (depending upon how many processor-scanner stations are communicating image set signals and associated identifications to hub station 20 at any given time). It will be appreciated that more than one processor-scanner station 2A to 2N may typically be in communication (such as by respective connections 10A) with hub station 20 at any given time.

There is also provided, as shown in FIG. 2A, a second communication means which can be in the form of a data tape storage in scanner system 6, onto which scanner system 6 automatically stores the first resolution digital image signal sets and associated identification signals. Tape 54 can then be physically transferred (as illustrated by physical transfer link 10b in FIG. 2A) to hub station 20. It will be appreciated, of course, that tape 54 could be replaced by any other suitable data storage means, such as optical or magnetic disks, onto which the second resolution image data is automatically stored by scanner system 6.

The embodiment of FIG. 2A then, allows the user the pleasure of having almost immediate access to the second (lower) resolution of their images from film 48, while avoiding undue delays on communication links 10A by using the tape 54 as a storage medium to physically transfer the stored, more data intensive, first resolution image set signals. This immediate access may even be before the user has obtained hardcopy prints 50 or film 52. Further, since link 10A may be a higher speed network on which usage is charged based on data volume or time usage, costs can be kept to a minimum using a cheaper means such as physical transfer link 10B. Note that link 10B is physically independent of link 10A. As an alternative, physical link 10B could be replaced with a transmission connection (a second network) which is slower, and may be of lower cost, than link 10A. Again, links 10A and 10B are physically independent of each other (this implies that once they leave scanner station 6, they do not share any portion of the same network).

The alternative embodiment shown in FIG. 2B is identical to that of FIG. 2A except the first communication system has only a first communication means, and instead of the second communicator means of tape 54 and physical link 10B, uses a condition monitor 70. Condition monitor 70 (which may simply be a art of the programming within the computer portion of scanner station 6), will pass the second (lower) resolution version of the image set signal, onto transmission line 10A as soon as the second resolution versions become available and line 10A is available. However, condition monitor 70 is programmed to wait until a predetermined condition arises before sending corresponding first (higher) resolution versions of the image set signals to hub station 20. These first resolution image set signals are stored on a suitable storage medium in the computer portion of scanner station 6, such as an optical or magnetic disk drive, for later retrieval on demand by condition monitor 70 when the predetermined condition arises. The predetermined condition for each first resolution image set signal is a condition which is independent of the communication of the second resolution image set signal for the corresponding image set. Thus the predetermined condition excludes simply a condition of sending the first resolution image set signal as soon as it is detected that the corresponding second resolution image set signal has been sent. The predetermined condition may for example be a preselected time (for example, a particular time of day and/or day of the week) after which all first resolution image set signals which have been stored in a suitable storage medium in scanner station 6 are sent. This time may be chosen when link 10A is not expected to be as busy or when usage charges on link 10A are lower (for example, after midnight on weekdays and any time weekends). Another alternative predetermined condition may be the load factor of the network formed by link 10A.

Thus, in the embodiment of FIG. 2B, costs for sending the higher resolution (and higher data intensive) first resolution image sets can be minimized, while still allowing a user almost immediate access to the second (lower resolution) image set signals. It should be noted that condition monitor 70 could be over-ridden by scanner station 6 when magnetic reader 7 detects the "high priority" code mentioned above, on film 48. In this case, the first resolution image set signal may be sent to hub station 20 immediately instead of the second resolution image set signal. In this case, a corresponding higher account charge would be automatically made to the customer's account.

Note that in either embodiment of FIGS. 2A and 2B, the fact that the unique identification signal is communicated with each of the first and second resolution image set signals, enables hub station 20 to properly match the first resolution image set signal with a corresponding, earlier received, second resolution image set signal (although matching is still possible even if the first resolution image set signal is received prior to the second resolution image set signal). Hub station 20 may then combine the first and second image set signals (in the case where the first image set signal contains only sufficient data to reconstruct the first resolution when combined with the second resolution image set signal), or may optionally delete the second image set signal to reduce storage space requirements.

The scanner system 6 at each processor-scanner station 2A to 2N, further includes a printer 8. Printer 8 is connected to scanner 6 so as to print out a hardcopy series of characters (shown as hardcopy identification 60 in FIG. 2A) corresponding to each identification signal.

The single hub station 20 may particularly be a digital computer, such as a workstation, minicomputer or mainframe computer, suitably programmed to execute the steps of the method of the present invention required of hub station 20. Hub station 20 includes a second communication system to receive image set signals and their associated identification signals from each of the processor-scanner stations 2A to 2N. The second communication system may be a modem or suitable communication card (not shown) in the hub station for the case where any of processor-scanner stations 2A to 2N will connect by a link such as the telephone circuit connection 10a of FIG. 2A, or may be a reading device (not shown) which can read a storage medium physically conveyed to hub station 20 when such a communication means is used by any of processor-scanner stations 2A to 2N. Of course, hub station 20 may have both such types of second communication means to accommodate the different types of communication means used by different processor-scanner stations 2A to 2N.

Hub station 20 further has a first storage device to store the received image set signals and their associated identification signals. Such storage device may be any suitable writeable magnetic or optical media (such as one or more hard disks or magnetic tape or optical disks or tape). A second storage, which may or may not be the same physical device as the first storage device, contains directory data correlating each scanner location identification with a scanner address (such as a conventional mailing address or electronic mail address).

Hub station 20 additionally has a third communication system for communicating stored image set signals to any of a plurality of terminals 40A, 40B, 40C to 40N connected to hub station 20. Such connection is illustrated as connections 30 in FIG. 1, and may, for example, be a network connection, dedicated data line connection, or telephone system connection. Preferably, one or more of the connections 30 will be network connections using the Internet. It will be appreciated that the second and third communication systems can be the same physical element, such as a suitable communication program operating through a modem card with one or more telephone connections, when at least one of the processor-scanner stations 2A to 2N communicates with hub station 20 using a connection in the same manner as at least one remote terminal 40A to 40N. Each of remote terminals 40A to 40N may also be any digital computer 42 with appropriate communication hardware and software to engage in two-way communication with hub station 20 over connections 30. The presence of such suitable hardware and software will be understood from each of the terminals 40A to 40N being "connected to communicate" with hub station 20. One or more remote terminals 40A may be connected to hub station 20 at any given time.

It will be appreciated that additional means for communicating image signals to hub station 20 can also be provided. For example, such additional means can include a digital camera which communicates a digital image to hub station 20, such as by a transmission over a network or telephone connection, or one or more scanner stations which do not have processors located at the same location.

Methods of the present invention which are executed on the system of FIGS. 1 and 2A will now be described. First, the user will deposit their undeveloped exposed film 48 at any one of the processor-scanner stations 2A to 2N which the user finds most convenient. The user will have previously identified on a magnetic layer of film 48, some or all of the images to be scanned and communicated to a hub station, as well as providing for such images an indication of the hub station address and a category identification, including user and album identification. The identification can be written on the film using a camera or other apparatus as mentioned above. At the selected processor-scanner station the user requests the type of processing and hardcopy images (for example, just negatives or additionally, reflective prints) desired and requests that an image set signal corresponding to the image set on film 48 be produced. These requests are made by checking appropriate boxes on a film processing envelope into which film 48 will be deposited, or can be magnetically recorded on film 48 to be read by reader 7 and further appropriate hardware/software. Film 48 will be processed (that is, chemically processed to yield a permanent image, which is sometimes references as "developing") to generate a corresponding negative set 52 and a corresponding print set 50. Different negative sets 52 from different corresponding films 48, will be batched together with negative sets from other orders requesting the scanning service, and images on the processed films carrying magnetic data indicating those images are to be scanned, will be scanned using high volume scanner system 6. As described earlier, each scanner system 6 will generate from each negative set 52, a corresponding first and second digital image set signals and will also generate an associated unique identification signal for each image set which is the same for both corresponding first and second image set signals. The identification signal includes a unique scanner location identification as discussed above, and in more detail below. The image set signal can be in any suitable format that will be acceptable to hub station 20, such as TIFF, JFIF, BMP, PICT, GIF, PhotoCD or particularly the recently announced FlashPix format. The identification signal will be associated with a corresponding image set signal, along with the corresponding hub station address identification and category identification.

A FlashPix file contains the complete image plus a hierarchy of several lower-resolution copies within the same file. This makes a FlashPix file function like a small file when users want it and like a big file when users need it. The FlashPix file structure employs Microsoft Corporation's OLE structured storage format, which holds image data and related descriptive information in a standardized "wrapper." The FlashPix format also records edits to an image as small scripts called "viewing parameters." Edits are applied to high-resolution images only when necessary—usually when users want high-quality output. The FlashPix format supports two clearly and completely defined color space options—a calibrated RGB color space definition and Photo YCC. The color space options are built directly into the file format. Optional JPEG compression, along with a single-color compression option where appropriate, is also provided. Further details of the FlashPix file format are available from Eastman Kodak Company, Rochester, N.Y.

Each print set 50, corresponding negative set 52, and associated identification, are forwarded to the end user (and hence, forwarded to a remote terminal when the user accesses such a remote terminal) by a route which is independent of hub station 20 (that is, this delivery to the end user does not go through hub station 20). Such independent routes 12 are indicated by lines in FIG. 1. In the case of the identification, this may consist simply of printing the identification associated with a given image set signal (and hence associated with the corresponding image set 52, 50 and film 48) with printer 8 and forwarding that printed identification with the associated hardcopy image sets 50, 52, to the user who deposited the associated film roll 48. This forwarding can simply be handing the print set 50, corresponding negative set 52 and associated printed identification 60 the user, or sending it to the user by some other means, such as conventional mail or courier. Alternatively, other routes independent of hub station 20 can be used as forwarding routes 12. For example, the identification could be communicated to the user by electronic mail, facsimile or some other means.

It is possible that, alternatively or additionally, the identification associated with a given film roll 48 could be communicated to the user through hub station 20, such as by an electronic communication (such as electronic mail through a connection such as the Internet). Such an electronic communication of the identification could simply be the same electronic communication of the identification communicated to hub station 20 along with the associated image set signal. Hub station 20 could then communicate the identification to a corresponding terminal 40A to 40N when the user communicates with (that is, logs onto) hub station 20. Such forwarding routes are indicated as forwarding routes 14. However, such a route is less desirable than routes 12 which are independent of hub station 20. This is because if hub station 20 does not receive the communicated image set signal and associated identification from the processor-scanner station at which the film roll 48 was scanned, the user does not have the identification available to her to use in determining why the associated image set signal is not available at hub station 20.

The digital image signal set corresponding to a customer's film roll 48, an associated identification signal, and the associated category identification, can be communicated from the processor-scanner station to hub station 20 at the address associated with the image set signal. The processor-scanner station preferably accomplishes this communication automatically (that is, without further operator intervention), particularly where the communication involves a transmission, based on the data recorded on film 48 indicating such communication is desired. The communication of the first and second image set signals has been described in detail above, in connection with FIGS. 2A and 2B. Hub station 20 receives each first and second digital image set and its associated identification signal and category identification, communicated from each processor-scanner station 4A to 4N in the first storage means. The identification signal is decrypted and each image set signal and associated category identification can be stored in the first storage and indexed by the decrypted identification. The corresponding first and second resolution image set signals may be combined, or the later received first resolution image set signal used to replace the earlier received corresponding second image set signal, all as previously discussed above.

The user will be able to attempt to access the digital image set corresponding to film roll 48 as soon as they receive the identification, by using any remote terminal, such as remote terminal 40A to connect to and communicate with hub station 20 by a connection 30. At that time, the user simply enters the identification and over the connection successfully completes a user registration process at hub station 20. The identification will allow the user to inquire of hub system 20 as to the location and status of the digital image set signal corresponding to the identification (and film roll 48). Hub station 20 decrypts the identification entered by the user, and can search its index for a saved digital image of predetermined characteristics associated with the decrypted identification entered by the user. By "predetermined characteristics" in this case, is referenced any suitable predetermined characteristics determined by the operator of the system. For example, hub station 20 may be programmed such that any image set signal received will be stored and indexed with its associated identification signal. Alternatively, the "predetermined characteristics" could be programmed so that only a complete image set is so stored, or incomplete image sets (such as might result from an interruption of a connection between a processor-scanner station 4A to 4N and hub station 20, or from corrupted data) or digital image sets in a format not accepted by hub 20, may be stored but are identified as not meeting the predetermined characteristics (for example, they are stored with an associated identification indicating incomplete or corrupted data, or a data format not supported by hub station 20).

If such a digital image set of predetermined characteristics exists, one or more of the images in the set may be communicated to the user at remote terminal 40A, or forwarded to another of the connected remote terminals 40B to 40N, as instructed by the user. In the latter case, this would amount to the user forwarding one or more copies of the digital image as desired. The user may then edit or print the images as desired, and may further communicate the edited image back to hub station 20 for storage in addition to or instead of, the original unaltered digital image. For longer term storage of the original or altered image, the user may indicate by suitable input at his terminal that he wishes to accept the category identification associated with the image. In this case, the original or altered image would then be automatically stored by hub station 20 under that category (which may be one of multiple pre-identified categories stored by hub station 20) without the user having to do anything further. The user may alternatively indicate some other category identification if desired.

Most of the foregoing steps, other than printing or ordering of final products, will normally be done with the second resolution image set signals, with printing and final products using the stored corresponding first resolution image set signals. However, a user has the ability to request the first resolution image set signal at any time. Note that before any image set signal is retrieved by hub 20, hub 20 will determine from the unique identification signal received from a remote terminal 40 (such as terminal 40A) whether the first or second resolution image set is stored at hub 20. If neither is stored there, hub station 20 can then determine from its directory data, the corresponding scanner address of the scanner at which the first resolution image set signal was generated. This data can be communicated to the remote terminal 40 and/or the appropriate scanner station 2 contacted by hub station 20 to inquire why neither the first or second resolution image set signal is available. Similarly, if only the first resolution image set is stored at hub station 20, this can be made available to the terminal 40 and the foregoing directory data used in the same manner to initiate an inquiry to the appropriate scanner station 2. This type of inquiry might be made any time a terminal 40 provides a unique identification, or may only be made after a preselected condition has been satisfied (for example, more than a preselected time has elapsed since the second resolution image set signal has been received and the first resolution image set signal has still not been received).

Furthermore, hub station 20 could be programmed to transmit to the user at a remote terminal, either upon request or automatically (in the form of advertising), details of services that can be requested from hub station 20. Such services may include various sized prints of an original or edited image stored at hub station 20 (either as prints by themselves, or with accompanying text or graphics, such as embodying the image in a greeting card), or the incorporation of one or more original or edited images onto a product, such as an article of clothing or other useful articles (for example, cups or plates). For this purpose, hub station 20 may communicate (preferably by transmission) the image signal and accompanying instructions, text, and/or graphics, to one or more printers (not shown) or other locations (not shown) at which the user's request may be fulfilled. Such printers or other locations may or may not be remote from hub station 20.

As mentioned digital image data may be lost in transit from a processor-scanner station to hub station 20, an error may occur during the loading of the digital image data to the hub station 20, the image quality may be poor, or some other problem may result in hub station 20 not storing the digital image set associated with the identification entered by the user.

If a digital image set of predetermined characteristics is not stored at hub station 20, different procedures can be used to inquire as to the whereabouts of such digital image set. For example, the date indication of the identification entered by the user can be compared with the current date. If the difference between the date identification of the entered identification and the current date is less than a tolerance predetermined by the user (for example, less than 5 days), hub station 20 may communicate a second message to the user at the remote terminal 40A stating that insufficient time has been allowed for receipt of the scanned image set, and to check again later. Additionally, hub station 20 could indicate to the user upon such an inquiry that an electronic mail message will be sent from hub station 20 to the electronic mail address of terminal 40A within an additional predetermined number of days (for example 10) when a digital image set associated with that identification is received at hub station 20, or by the end of that additional predetermined period if no such digital image set is received. Hub station 20 can then index the additional predetermined date and automatically send the foregoing messages when, or if no, digital image set associated with the identification is received at hub station 20 by the predetermined date.

If the difference between the two dates exceeds the predetermined tolerance, hub station 20 can then determine from the directory database in the second storage, the scanner address associated with the user entered identification. In the particular example above, this would be scanner 2A. Hub station 20 can then forward a first message in the form of an inquiry to the determined scanner address to inquire as to the particulars of the communication of the digital image set associated with that identification, or in the form of a request to repeat the communication if possible (for example, where the determined processor-scanner station has stored a copy of the digital image set). Hub station 20 can connect to the determined processor-scanner station 2A to deliver the first message as, for example, be an electronic mail message or facsimile, if the processor-scanner station has the capacity to receive such a message. In the case of the electronic message in particular, the processor-scanner stations 2A to 2N may optionally be equipped with a storage which stores particulars of when and how each digital image set and associated identification was communicated to hub station 20. In this case, a processor-scanner station to which an inquiry was sent, could access such particulars of digital image set status and disposition in response to the inquiry, and communicate them to hub station 20 through a connection, for communication to a connected terminal 40A to 40N. Alternatively, the first message can be printed at hub station 20 and forwarded by conventional mail or courier to the determined processor-scanner station such as processor-scanner station 2A.

Of course, the sequences in the foregoing paragraph can optionally be executed upon receipt of a user inquiry, without the described comparing of the difference in the two dates.

It will be appreciated from the above, that the end user is able to drop off multiple film rolls at different ones of the processor-scanner stations 2A to 2N and access the corresponding digital image sets, without ever having to keep track of which film rolls were dropped off at which processor-scanner stations, and accesses all scanned image sets at the one hub station 20. Furthermore, the unique scanner location identification aids in tracing a digital image set if for any reason it is not available from hub station 20 by the user.

Figure 4:
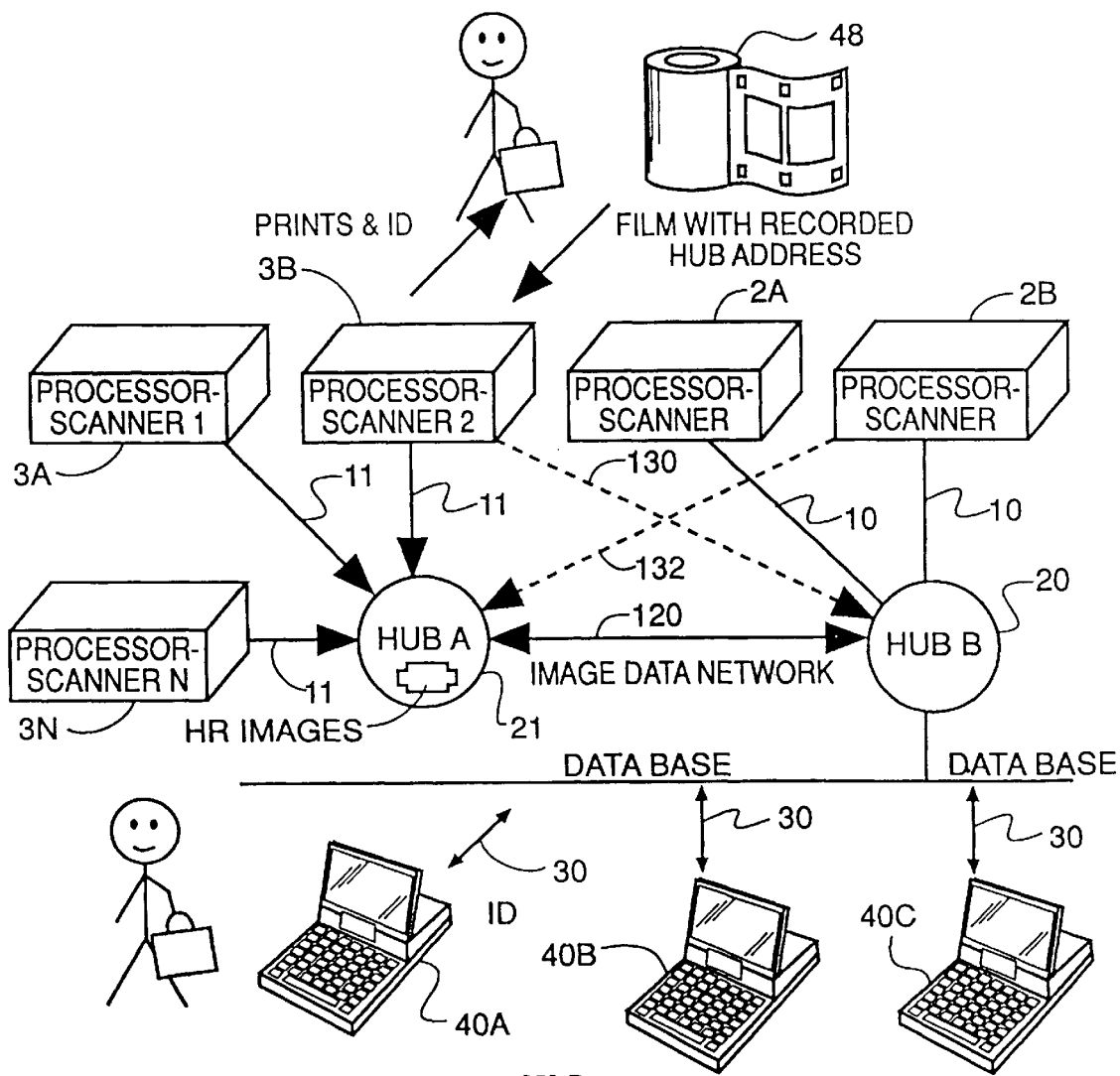
FIG. 4 is a block diagram illustrating a system of FIG. 1 with a further connection of the hub to another hub.

Referring to FIG. 4, there is illustrated the situation where more than one hub station is present in the overall system, each hub serving different geographical regions (such as different countries or different sub-regions within a country, such as one or more postal zip code areas). In FIG. 4, hub station 20 is only shown with processor-scanner stations 2A and 2B communicating therewith, although it will be understood that further processor-scanner stations 2C to 2N can be present. A second hub station 21, which may be the same as hub station 20, is in communication with processor-scanner stations 3A, 3B to 3N over communication links 11, in any of the manners hub station 20 may be in communication with processor-scanner stations 2A to 2N, as described above. A plurality of user terminals (not shown) may further be connected to hub station 21. There may, of course, be a further connections of hub station 20 to other hub stations (not shown) each with their own associated processor-scanner stations and terminals (not shown). Hub station 20 may communicate with each over a data network or other connection, such as hub station 20 communicates with hub station 21 over image data network 120. Although communications involving physical transfers can be used between hub stations, this is less preferred than communications involving transmission over connections. The communication connection from one hub station to hub station 20 can be through one or more other hub stations or not.

In one method executed by the system of FIG. 4, each of the multiple hub stations (such as hub station 20 and 21) would have directory data in their respective second storages. This directory data correlates each scanner location identification with a scanner address and the address of the hub with which that processor-scanner station normally communicates. With this arrangement, a user can drop off film 48 for processing and scanning at any processor-scanner station which normally communicates with an associated hub, and automatically retrieve digital images at any terminal by communicating at another hub. As particularly shown in FIG. 4, the user drops off a film for processing and scanning at processor-scanner station 3B. The print set and associated unique identification are returned to the user. Processor-scanner station will communicate the digital image set of that film to hub station 21, with which it is normally associated. When the user attempts to retrieve the digital image set from a terminal 40A connected to hub station 20, hub station 20 will compare the decrypted identification transmitted to it by the user with its directory data and ascertains that the film associated with that identification was scanned at processor-scanner station 3B, which processor-scanner station normally communicates with hub station 21. Hub station 20 will then forward a request to hub station 21 (preferably a transmitted request over image data network 120) for the associated digital image set to be communicated to hub 20. Preferably this communication occurs also as a transmission from hub 21 to hub 20. In this example then, it will be seen that the communication from processor-scanner station 3B to hub station 20, was an indirect communication through hub station 21.

In another method which can be executed by the system of FIG. 4, an indication of the hub station address, as discussed above, has been recorded on the magnetic layer of film 48 by the user using a camera or other apparatus as mentioned above. In this case, processor-scanner station 3B may be programmed to automatically communicate image signal sets and associated data to the hub station so identified. For example, if the magnetically recorded data on film 48 provides an indication of the address of hub station 21, processor-scanner station 3B can automatically communicate an image set signal corresponding to one or more images on film 48, to hub station 21 through communication link 11.

Alternatively, if the data on film 48 provides an indication of the address of hub station 20, processor-scanner station 3B can either directly communicate the second resolution image set signal to hub station 20 through a communication link 130, or may indirectly do so by communicating the second resolution image set signal first to hub station 21 through link 11 along with the address indication of hub station 20. Hub station 21 may then be programmed to forward the second resolution image set signal over image data network 120 to hub station 20. Similarly, other second resolution image set signals obtained at other processor-scanner stations can be communicated directly or indirectly to other hub stations than that with which a particular process-scanner is normally associated. For example, processor-scanner 2A can communicate directly through communication link 132 with hub station 21, or indirectly with it through links 10 and 120. With regard to the first resolution image set signal, this could travel along the same paths as the second resolution image set, under control of a condition monitor 70 at processor-scanner station 3B and optionally also under the control of a similar condition monitor 70 at hub station 21. Alternatively, the first resolution image set signals could follow a second communication method which is either partially or completely independent of the first communication method defined by the described paths. For example, the second resolution could travel through link 11 to hub station 21 and then by link 120 to hub station 20 while the corresponding first resolution image set signal would travel on a storage media physically transferred from processor-scanner station 3B directly to hub station 20.

Note that in the above situation where the film 48 provides an indication of a hub station address, communicating indirectly with the indicated hub station can be advantageous where the hub station address identification is an indirect one. In particular, as discussed above, if the hub station address indication is an indirect indication (such as customer's address or postal code), then direct communication from a processor-scanner station requires a database at that processor-scanner station in order to obtain the necessary direct address from the indirect address. This requires that a current version of the database be maintained at each processor-scanner station. On the other hand, if the processor-scanner station simply communicates the image set signal and the associated indirect hub station address to the hub station with which it is normally associated with, the current database need reside only in the hub stations. Since the hub stations preferably communicate by image data network 120 which are typically high capacity transmission connections, and there are far fewer hub stations than scanner stations, it is a simple matter for each hub station to be provided with a current version of the necessary database.

Figure 5:
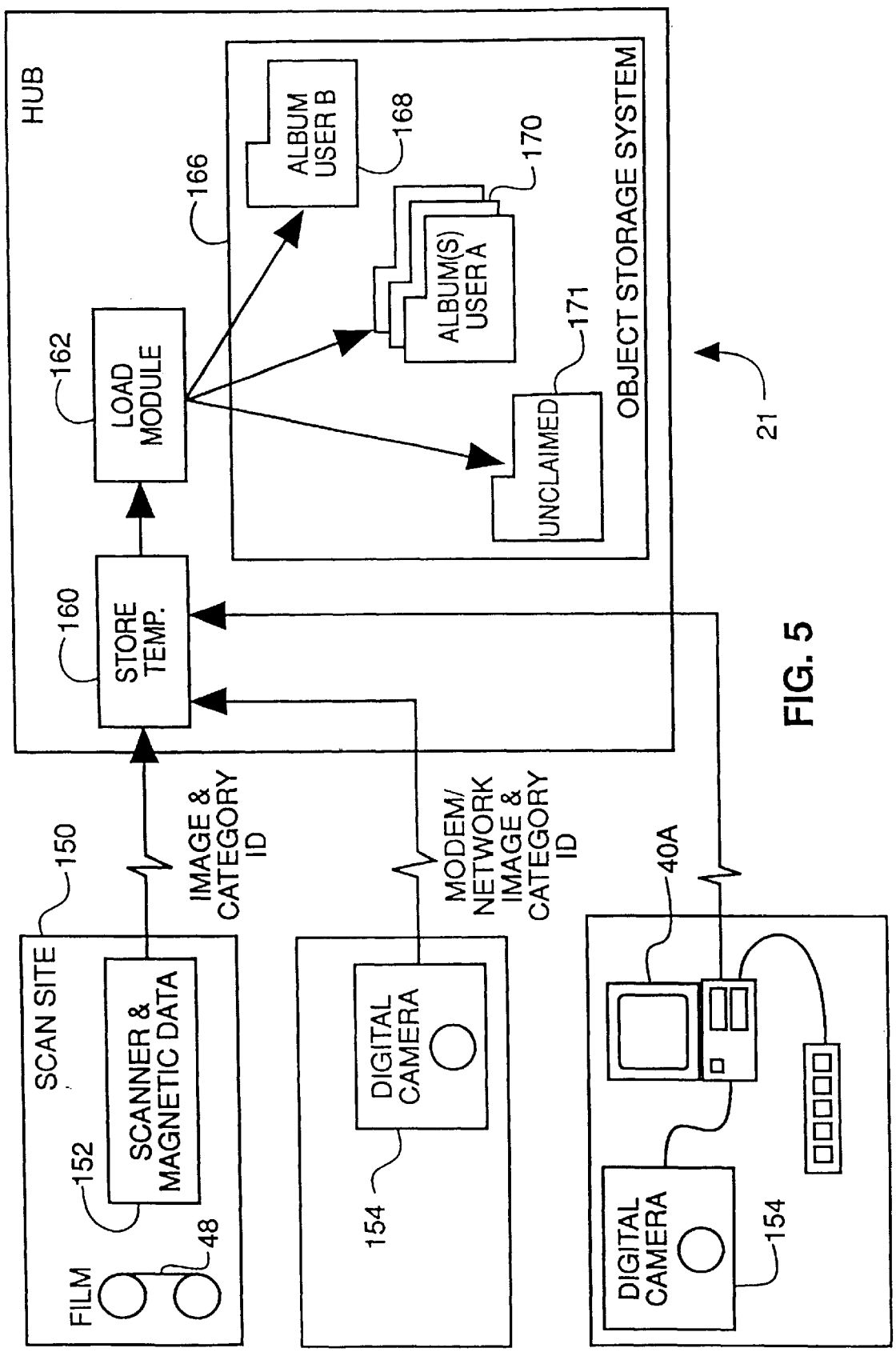
FIG. 5 is a block diagram illustrating another system of the present invention.

In the system illustrated in FIG. 5 image data and category data can be obtained at a scan site 150. Scan site 150 includes a scanner which generates an image set signal in accordance with the image set on a film 48. Scan site 150 also includes a magnetic reader which can read category identification data from a magnetic layer on film 48. The scanner and magnetic reader are contained in unit 152. Alternatively the image set signal and category data can be obtained from a digital camera 154 (specifically from a memory housed in camera 154), or from a computer 40A connected to a digital camera (such as at a user's home PC, or a commercial copy/print station, for example the KODAK IMAGE MAGIC PRINT SYSTEM available from Eastman Kodak, Rochester, N.Y.). The data (that is, the image set signal and category data) can then be communicated to a remote second location in the form of hub 21, through a private or public communication channel such as the Internet using a modem or other suitable hardware (not shown).

Image data and category data received at hub 41 are stored in temporary storage 160. A load module 162 reads the image and category data from temporary storage 160 and loads the image data into different categories 168, 170, or 171 in an object storage system 166, as determined by the category data associated with the image set signal. It will be appreciated that categories 168, 170, 171 are not physical categories, but simply represent groups of images which are associated into respective categories as determined by object storage system 166 (e.g. Album User B 168 represents images associated with user B by object storage system 166, such as under a directory entitled "B"). Images could be accessed from hub 21 at remote terminals in a manner the same as described above in connection with other embodiments of the invention.

Each processor-scanner station 2 can be regarded as a first location in the above embodiments, while hub station 20 can be regarded as a second location. It will be appreciated in the present invention, that in some cases the first location may be other than a processor-scanner station 2. For example, the first resolution image sets obtained from a processor-scanner station 2, such as processor-scanner station 2A, might all be sent via a local high speed network to a first location remote from that processor-scanner station. At that first location, the second resolution image set could be derived from the first resolution image set, and either the first communication system of FIGS. 2A or 2B used to then communicate those image sets to hub station 20. That is, immediately following scanner station 6, there could be an intermediate location remote from the corresponding processor-scanner location 2.

The invention has been described with reference to a preferred embodiment However, it will be appreciated that variations and modifications can be effected by a person of ordinary skill in the art without departing from the scope of the invention.

PARTS LIST

| | |
|---|---|
| 2A, 2B, 2C to 2N | Processor-Scanner Station |
| 3A, 3B to 3N | Processor-Scanner Stations |
| 4 | Film Processor |
| 6 | Scanner System |
| 7 | Data Reader |
| 8 | Printer |

-continued

PARTS LIST

| | |
|---|---|
| 10, 11, 130 | Communication Links |
| 10a | Connection |
| 10b | Transfer Link |
| 12, 14 | Routes |
| 20, 21 | Hub Stations |
| 30 | Connections |
| 40A, 40B, 40C to 40N | Terminals |
| 41 | Hub |
| 42 | Digital Computer |
| 48 | Film Roll |
| 50 | Print Set |
| 52 | Negative Set |
| 54 | Tape |
| 60 | Identification |
| 70 | Condition Monitor |
| 100 | Bit Sum |
| 102 | ID Version |
| 104 | Scanner ID |
| 106 | Date Code |
| 108 | Sequence Number |
| 120 | Network |
| 132 | Communication Link |
| 150 | Scan Site |
| 152 | Unit |
| 154 | Camera |
| 160 | Temporary Storage |
| 168 | Album User B |
| 162 | Module |
| 166 | Storage System |
| 168, 170, 171 | Categories |

We claim:

1. An image handling method comprising:

(a) scanning at least a first resolution of a hardcopy image;

(b) communicating a second resolution image signal of the same image which second resolution is lower than the first resolution, from a first location to a receiver at a second location remote from the first location, by a first communication method;

(c) establishing an optimum time period for transmitting the first resolution image signal according to a predetermined set of parameters;

(d) providing a condition monitor to identify when the optimum time periods occurs;

(e) communicating the first resolution image signal from the first location to the receiver at the second location, by a second communication method during the optimum time period.

2. A method according to claim 1 wherein the first communication method is a transmission over a first network.

3. A method according to claim 2 wherein the second communication method is a transmission over a second network independent of the first network.

4. A method according to claim 2 wherein the second communication method is a physical transfer of a media on which the first resolution image signal is recorded.

5. A method according to claim 1 wherein the condition monitored is one of the predetermined parameters selected from either time or network load.

6. A method according to claim 1 wherein the second resolution image signal is derived from the first resolution image signal.

7. An image handling method comprising:

(a) scanning at least a first resolution of a hardcopy image at a first location;

(b) transmitting a second resolution image signal of the same image which second resolution is lower than the first resolution, from the first location to a receiver at a second location remote from the first location, by a first network;

(c) establishing an optimum time period for transmitting the first resolution image signal according to a predetermined set of parameters;

(d) providing a condition monitor to identify when the optimum time periods occurs;

(e) communicating the first resolution image signal from the first location to the receiver at the second location, by a communication method during the optimum time period.

8. A method according to claim 7 wherein the communication method is a transmission over a second network independent of the first network.

9. A method according to claim 7 wherein the communication method is a physical transfer of a media on which the first resolution image signal is recorded.

10. A method according to claim 7 wherein the condition monitored is one of the predetermined parameters selected from either time or network load.

11. An image handling system comprising:
   (a) a scanner to scan at least a first resolution of a hardcopy image;
   (b) a first communication means for communicating a second resolution image signal of the same image which second resolution is lower than the first resolution, from a first location to a receiver at a second location remote from the first location, by a first communication method;
   (c) means for establishing an optimum time period for transmitting the first resolution image signal according to a predetermined set of parameters;
   (d) a condition monitor to identify when the optimum time periods occurs;
   (e) a second communication means for communicating the first resolution image signal from the first location to the receiver at the second location, by a second communication method during the optimum time period.

12. An image handling system according to claim 11 wherein the first communication method provided by the first communication means is a transmission over a first network.

13. A method according to claim 11 wherein the second communication method provided by the second communication means is a transmission over a second network independent of the first network.

14. An image handling method comprising:
   (a) processing exposed photographic film at a processor-scanner station which has both a scanner and a processor at the same location, to produce a hardcopy image set at the processor-scanner location;
   (b) scanning the hardcopy image set at the same processor-scanner location at which it was processed, to obtain a corresponding first resolution image set signal;
   (c) communicating a second resolution image set signal of the same images which second resolution is lower than the first resolution, from a first location to a hub station at a second location remote from the first location, by a first communication method;
   (d) establishing an optimum time period for transmitting the first resolution image signal according to a predetermined set of parameters;
   (e) providing a condition monitor to identify when the optimum time periods occurs;
   (f) communicating the first resolution image set signal from the first location to the hub station, by a second communication method during the optimum time period;
   (g) storing the communicated first and second resolution image set signals at the hub station; and
   (h) transmitting at least one image signal of the first and second resolution image set signals to any of a plurality of terminals remote from the hub station and the processor-scanner station.

15. A method according to claim 14 wherein the processor-scanner station is at the first location.

16. A method according to claim 14 wherein the first communication method is a transmission over a first network.

17. A method according to claim 14 wherein the second communication method is a transmission over a second network independent of the first network.

18. A method according to claim 14 wherein the second communication method is a physical transfer of a media on which the first resolution image set signal is recorded.

19. A method according to claim 14 additionally comprising:
   i communicating from the first location the same unique identification signal associated with the first and second resolution image set signals;
   j storing at the hub, the communicated identification signal.

20. A method according to claim 19 wherein the identification signal comprises a scanner location identification, wherein each scanner location identification is unique.

21. A method according to claim 19, additionally comprising:
   (k) transmitting the unique identification signal from a remote terminal to the hub station;
   (l) determining if the first or second resolution image set signal associated with the unique identification transmitted from the remote terminal, is stored at the hub station; and
   (m) if neither the first nor second resolution image set signal is stored at the hub station, determining from directory data stored at the hub station, a scanner address of a scanner at which the first resolution image set signal was generated which corresponds to the unique identification received from the remote terminal.

22. A method according to claim 19, additionally comprising:
   (k) transmitting an image signal of the image set at a third resolution at or below the second resolution, to a terminal remote from the hub station;
   (l) transmitting a request for the first resolution image signal of the image transmitted in (i) from the remote terminal to the hub station;
   (m) determining if the first resolution image set signal associated with the unique identification transmitted from the remote terminal, is stored at the hub station; and
   (n) if the first resolution image set signal is not stored at the hub station, determining from directory data stored at the hub station, a scanner address of a scanner at which the first resolution image set signal was generated which corresponds to the unique identification associated with the first resolution image set signal.

* * * * *